(12) United States Patent
Bara et al.

(10) Patent No.: US 12,378,146 B2
(45) Date of Patent: Aug. 5, 2025

(54) DEPOSITION OF FLOCCULATED TAILINGS

(71) Applicant: SYNCRUDE CANADA LTD. in trust for the owners of the Syncrude Project as such owners exist now and in the future, Calgary (CA)

(72) Inventors: Barry Bara, Edmonton (CA); Randy Mikula, Edmonton (CA)

(73) Assignee: SYNCRUDE CANADA LTD. in trust for the owners of the Syncrude Project as such owners exist now and in the future, Calgary (CA)

( * ) Notice: Subject to any disclaimer, the term of this patent is extended or adjusted under 35 U.S.C. 154(b) by 324 days.

(21) Appl. No.: 18/045,743

(22) Filed: Oct. 11, 2022

(65) Prior Publication Data

US 2024/0116793 A1    Apr. 11, 2024

(51) Int. Cl.
| | | |
|---|---|---|
| C02F 11/147 | (2019.01) | |
| B01D 21/24 | (2006.01) | |
| C02F 1/52 | (2023.01) | |
| C02F 1/56 | (2023.01) | |
| C02F 11/145 | (2019.01) | |
| C10G 1/04 | (2006.01) | |
| F17D 1/08 | (2006.01) | |
| B01D 21/01 | (2006.01) | |
| C02F 103/10 | (2006.01) | |
| F17D 3/16 | (2006.01) | |

(52) U.S. Cl.
CPC .......... *C02F 11/147* (2019.01); *B01D 21/245* (2013.01); *C02F 1/52* (2013.01); *C02F 1/56* (2013.01); *C02F 11/145* (2019.01); *C10G 1/04* (2013.01); *F17D 1/088* (2013.01); *B01D 21/01* (2013.01); *C02F 2103/10* (2013.01); *C02F 2209/40* (2013.01); *F17D 3/16* (2013.01)

(58) Field of Classification Search
USPC ....... 210/702, 723–739, 747.1, 747.4, 747.9, 210/749, 767, 768, 770, 87, 91, 109, 210/198.1, 199, 205–208
See application file for complete search history.

(56) References Cited

U.S. PATENT DOCUMENTS

2014/0116521 A1* 5/2014 Leneve ................. F17D 3/01
137/4

FOREIGN PATENT DOCUMENTS

| | | |
|---|---|---|
| CA | 2678818 | 3/2011 |
| CA | 2789678 | 3/2013 |
| CA | 2820665 | 12/2013 |
| CA | 2932810 | 12/2013 |
| CA | 2792786 | 4/2014 |
| CA | 2831329 | 4/2014 |
| CA | 2886565 | 5/2014 |

(Continued)

*Primary Examiner* — Clare M Perrin
(74) *Attorney, Agent, or Firm* — Knobbe, Martens, Olson & Bear, LLP (57) ABSTRACT

A process for dewatering tailings having a solids content in the range of about 10 wt % to about 70 wt % is provided comprising fully flocculating the tailings by adding an effective amount of a polymeric flocculant to the tailings and mixing the polymeric flocculant and tailings in a mixing device to form fully flocculated tailings having a minimized capillary suction time (CST) and discharging the fully flocculated tailings into a deposition area at a discharge velocity of substantially zero to minimize further mixing.

24 Claims, 5 Drawing Sheets

(56) References Cited

FOREIGN PATENT DOCUMENTS

CA        2886983     9/2016
CA        3062142     5/2020

\* cited by examiner

Elbow at end of discharge pipe

DEPOSITION OF FLOCCULATED TAILINGS

TECHNICAL FIELD

The following relates to a process for dewatering tailings such as oil sands tailings. In particular, a process is provided for optimizing the dewatering of polymeric flocculant-treated tailings by controlling the deposition or discharge conditions of polymeric flocculant-treated tailings into a deposition area.

BACKGROUND

Oil sands deposits such as those found in the Athabasca Region of Alberta, Canada, generally comprise water-wet sand grains held together by a matrix of viscous heavy oil or bitumen. Bitumen is a complex and viscous mixture of large or heavy hydrocarbon molecules that contain a significant amount of sulfur, nitrogen and oxygen. Oil sands processing involves extraction and froth treatment to produce diluted bitumen that is further processed to produce synthetic crude oil and other valuable commodities. The extraction of bitumen from sand using hot water processes yields large volumes of fine tailings composed of fine silts, clays, residual bitumen and water. Mineral fractions with a particle diameter less than 44 microns are referred to as "fines." These fines are typically clay mineral suspensions, predominantly kaolinite and illite. The fine tailings suspension is typically between 55 and 85% water and/or 15 to 45% fine particles by mass. Dewatering of fine tailings occurs very slowly.

Generally, the fine tailings are discharged into a storage pond for settling and dewatering. When first discharged in the pond, the very low density material is referred to as thin fine tailings. Dewatering of thin fine tailings occurs very slowly. After a few years, when the thin fine tailings have reached a solids content of about 30-35 wt %, they are referred to as fluid fine tailings (FFT) and sometimes mature fine tailings (MFT), which still behave as a fluid-like colloidal suspension. The fact that mature fine tailings behave as a fluid and have very slow consolidation rates significantly limits options to reclaim tailings ponds. Thus, a challenge facing the industry remains the removal of water from the fluid fine tailings to strengthen the deposits, so that they can be reclaimed and no longer require containment.

Most of the recent efforts surrounding the elimination of tailings ponds involve removing FFT from the ponds, such as by dredging, and performing one or more of mechanical, chemical or electrical processes followed by placement of the partially dewatered tailings to form a landform. One such process involves flocculating FFT using conventional flocculating agents. The flocculated solids are then added to a tailings deposition site where accelerated dewatering can occur. The current state of the art attempts to achieve optimum flocculant dosage and optimum mixing in a mixing vessel or in-line mixer located at some distance along a discharge pipe (see, for example, CA 2,789,678 and CA 2,678,818). However, achieving optimum flocculation has been a challenge for the industry and the majority of recent development in the industry has been focused on the optimization of polymer/FFT and not much attention has be placed on the manner in which FFT is deposited.

It was recently discovered by the present applicant that the manner in which flocculated tailings are deposited in deposition sites can have a negative impact on the dewatering of the deposit, in particular, when dealing with fully (completely) flocculated tailings. Up until now, it was commonly believed that additional mixing was required at discharge, as obtaining fully (completely) flocculated tailings was not possible. Thus, the previous state of the art relied on the discharge velocity at deposition to improve tailings/flocculant mixing to improve flocculation of the tailings (see, for example, Canadian Patent Application No. 2,886,983).

Hence, there is a need in the industry to be able to achieve fully (completely) flocculated tailings, together with a deposition scheme for depositing same, to enhance the dewatering of flocculated tailings.

SUMMARY

The present application is directed to a method of dewatering tailings, in particular, oil sands tailings, by first optimizing flocculation conditions to obtain fully (completely) flocculated tailings and then controlling the discharge of the flocculated tailings into a tailings deposition site. Thus, broadly stated, in one aspect, a process for dewatering tailings is provided, comprising:

providing a tailings feed having a solids content in the range of about 10 wt % to about 70 wt %;

adding an effective amount of a polymeric flocculant to the tailings feed and mixing the polymeric flocculant and tailings feed mixture in a mixing device sufficient to flocculate the tailings and minimize the capillary suction time (CST) of the flocculated tailings to form fully flocculated tailings;

transporting the fully flocculated tailings to a deposition area;

discharging the fully flocculated tailings into the deposition area at a discharge velocity of substantially zero to minimize further mixing;

naturally forming a sloped beached material deposit in the deposition area whereby water is released from the sloped beached material to form a released water pool that pools away from the sloped beached material; and continuously removing water from the released water pool to ensure that the sloped beached material at a discharge point is at a higher elevation than the released water pool to minimize any buoyant forces on the beached material deposit.

In one embodiment, the mixing device is a dynamic mixer. In one embodiment, the tailings are oil sand tailings. In one embodiment, the oil sand tailings are fluid fine tailings (FFT) or mature fine tailings (MFT). In one embodiment, the tailings have a solids content in the range of about 15 wt % to about 45 wt %, in particular, when the tailings are FFT or MFT. In one embodiment, the FFT or MFT are diluted to about 20 wt % to about 30 wt % solids content.

In one embodiment, the polymeric flocculant is a water-soluble polymer having a moderate to high molecular and an intrinsic viscosity of at least about 3 dl/g (measured in 1M NaCl at 25° C.). The polymeric flocculant may be cationic, non-ionic, amphoteric, or anionic. The polymeric flocculant can be in an aqueous solution at a concentration of about between 0.05 and 5% by weight of polymeric flocculant. Typically, the polymeric flocculant solution will be used at a concentration of about 1 g/L to about 5 g/L.

Suitable doses of polymeric flocculant can range from 10 grams to 10,000 grams per tonne of tailings. Preferred doses range from about 400 to about 1,500 grams per tonne of tailings.

In one embodiment, the tailings feed is first treated with a coagulant prior to the addition of the polymeric flocculant to form fully flocculated tailings. In one embodiment, the coagulant is gypsum added at an average dosage of about 900 to about 1500 grams per tonne. In one embodiment, the coagulant is flue-gas desulfurization (FGD) solids added at an average dosage of about 1000 to about 4000 grams per tonne. Flue-gas desulfurization (FGD) is a set of technologies used to remove sulfur dioxide ($SO_2$) from exhaust flue gases of fossil-fuel power plants. Particularly useful are FGD solids produced when using calcium oxide to remove sulfur dioxide from flue gases and emissions, which, on average, are comprised of about 30% slaked lime, 6% gypsum and 64% inerts. In one embodiment, the coagulant is lime added at an average dosage of about 900 to about 1500 grams per tonne. In one embodiment, the coagulant is alum added at an average dosage of about 900 to about 1500 grams per tonne.

In one embodiment, the fully flocculated tailings has a capillary suction time (CST) of <75 seconds, preferably <50 seconds, and more preferably <25 seconds. In one embodiment, the fully flocculated tailings are discharged either sub-aerially or sub-aqueously. In one embodiment, the fully flocculated tailings are deposited sub-aerially at or near the surface of the tailings deposit. In one embodiment, the fully flocculated tailings are transported to the deposition area by means of a horizontal pipe, said horizontal pipe having a discharge end comprising an elbow and a vertical pipe of sufficient length to eliminate the horizontal velocity of the fully flocculated tailings such that the velocity of the fully flocculated tailings upon discharge is substantially zero.

Additional aspects and advantages of the present method will be apparent in view of the description, which follows. It should be understood, however, that the detailed description and the specific examples, while indicating preferred embodiments, are given by way of illustration only, since various changes and modifications will become apparent to those skilled in the art from this detailed description.

BRIEF DESCRIPTION OF THE DRAWINGS

The method provided will now be described by way of an exemplary embodiment with reference to the accompanying simplified, diagrammatic, not-to-scale drawings.

DETAILED DESCRIPTION

A method is provided for dewatering tailings. As used herein, the term "tailings" means any tailings produced during a mining operation, including tailings derived from oil sands extraction operations, which contain a fines fraction. The term is meant to include fluid fine tailings (FFT) from tailings ponds (also referred to as mature fine tailings (MFT)) and other fine tailings (for example, thickener underflow or froth treatment tailings, which may bypass a tailings pond) which are derived from ongoing oil sands extraction operations. As used herein, the term "fine tailings" means tailings that are derived from oil sands extraction operations that contain a fines fraction. Fines are generally defined as solids having a diameter less than 44 microns. The raw FFT will generally have a solids content of around 30 to 40 wt % and may be diluted to about 20-30 wt % with water for use in the present process. However, any oil sands fine tailings having a solids content ranging from about 10 wt % to about 70 wt % or higher can be used.

As used herein, the term "flocculant" refers to a reagent that bridges the neutralized or coagulated particles into larger agglomerates, resulting in more efficient settling. Flocculants useful herein are generally anionic, nonionic, cationic or amphoteric polymers, which may be naturally occurring or synthetic, having relatively high molecular weights. Preferably, the polymeric flocculants are characterized by molecular weights ranging between about 1,000 kD to about 50,000 kD. Suitable natural polymeric flocculants may be polysaccharides such as dextran, starch or guar gum. Suitable synthetic polymeric flocculants include, but are not limited to, charged or uncharged polyacrylamides, for example, a high molecular weight polyacrylamide-sodium polyacrylate co-polymer. Useful flocculating polymers or "flocculants" include charged or uncharged polyacrylamides such as a high molecular weight polyacrylamide-sodium polyacrylate co-polymer with about 25-35% anionicity. The polyacrylamide-sodium polyacrylate co-polymers may be branched or linear and have molecular weights that can exceed 20 million.

Other useful polymeric flocculants can be made by the polymerization of (meth)acrylamide, N-vinyl pyrrolidone, N-vinyl formamide, N,N dimethylacrylamide, N-vinyl acetamide, N-vinylpyridine, N-vinylimidazole, isopropyl acrylamide and polyethylene glycol methacrylate, and one or more anionic monomer(s) such as acrylic acid, methacrylic acid, 2-acrylamido-2-methylpropane sulphonic acid (ATBS) and salts thereof, or one or more cationic monomer(s) such as dimethylaminoethyl acrylate (ADAME), dimethylaminoethyl methacrylate (MADAME), dimethydiallylammonium chloride (DADMAC), acrylamido propyltrimethyl ammonium chloride (APTAC) and/or methacrylamido propyltrimethyl ammonium chloride (MAPTAC).

As used herein, the term "coagulant" refers to a reagent that neutralizes repulsive electrical charges surrounding particles to destabilize suspended solids and to cause the solids to agglomerate. Suitable coagulants include, but are not limited to, alum, aluminum chlorohydrate, aluminum sulphate, lime (calcium oxide), slaked lime (calcium hydroxide), calcium chloride, magnesium chloride, iron (II) sulphate (ferrous sulphate), iron (III) chloride (ferric chloride), sodium aluminate, gypsum (calcium sulphate dehydrate), Flue Gas Desulfurization Solids ("FGD solids", the composition of which is described in more detail below), or any combination thereof.

As used herein, "g/tonne" or "g/t" means an amount of coagulant, FGD solids or flocculant (in grams) added per tonne of tailings solids.

As used herein, "flocs" are larger-size clusters of mineral particles produced as a result of flocculation. "Flocculation" is a process of contact and adhesion of mineral particles due to the addition of a flocculant, a coagulant or a combination of a flocculant and coagulant.

As used herein, "fully flocculated tailings" means tailings (either untreated tailings or tailings that have been first treated with a coagulant such as gypsum, alum, lime or FGD solids) that are treated with a flocculant, resulting in a flocculant-treated tailings product having a low capillary suction time (CST). CST can be measured using a Triton Electronics Ltd. Capillary Suction Time tester and measures how long it takes for water to be suctioned through a filter. Low values indicate rapid dewatering, which is the case when tailings are fully flocculated, whereas high values indicate slow dewatering ability and, thus, poor flocculation. Thus, fully flocculated tailings would have a low CST and poorly flocculated tailings would have a high CST. For tailings such as FFT or MFT having about 25 wt % to about 30 wt % solids, a low CST would be <50 seconds, preferably <25 seconds. For tailings such as FFT or MFT having a higher solids content, i.e., about 30 wt % to about 35 wt % solids, a low CST would be about <50 seconds to about <75 seconds. Further, "fully flocculated tailings" are characterized by the water release when the fully flocculated tailings are slowly poured over the edge of a sample bucket in that the fully flocculated tailings will break off in chunks with clear water released as the chunks break away. "Fully flocculated tailings" can also be determined by visually inspecting the flocculated tailings in either a glass pipe or a glass jar where a flocculated structure having large water channels between the flocs is observed. In operational practice, a flocculated tailings sample is typically both visually inspected and the CST is determined in the lab.

Figure 1:
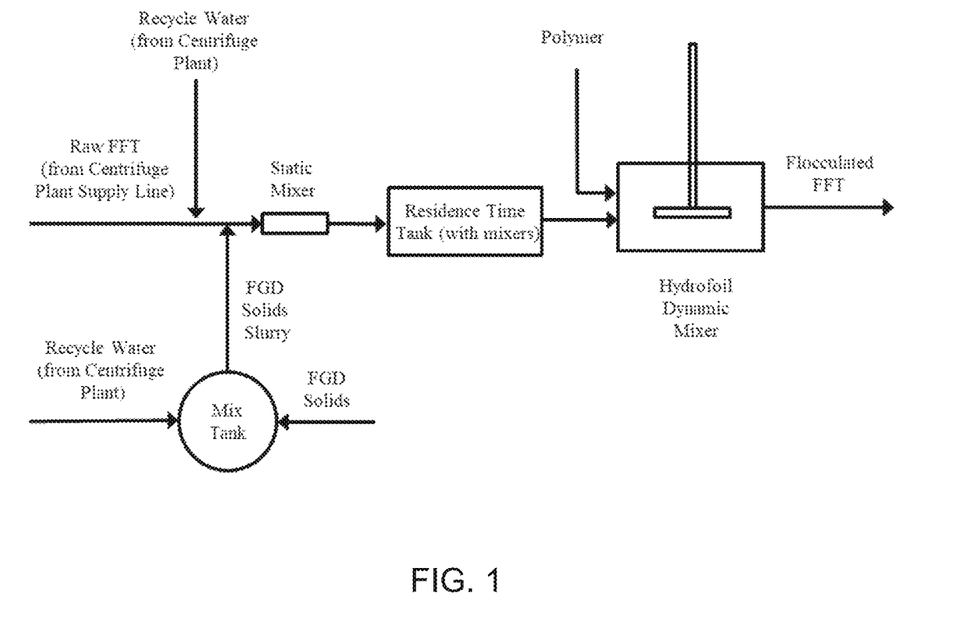
FIG. 1 shows a schematic of a method for treating and dewatering raw Fluid Fine Tailings (FFT).

FIG. 1 shows a simplified flow sheet for producing fully flocculated tailings. In particular, raw fluid fine tailings (Raw FFT) 10, taken from the FFT centrifuge plant main feedline, was diluted with recycle water 12 for density control. Recycle water was supplied from the FFT centrifuge plant. The FFT was pretreated with FGD solids slurry 14, which slurry was formed by mixing FGD solids 16 and recycle water 12 in mix tank 18. The FGD solids slurry 14 was added to the Raw FFT 10 upstream of a static mixer 20 and the Raw FFT and FGD solids mixture 22 was then fed to a residence time tank 24, which tank was equipped with mixers, to provide sufficient time for the calcium ions present in the FGD solids slurry to dissolve into solution and interact with the clay particles present in the FFT. The pretreated FFT 26 was then fed to a hydrofoil dynamic mixer 28 where polymer solution 30 was added to create a flocculated FFT stream 32 that was subsequently sent to a deposition cell. It is understood, however, that any dynamic mixer could be used.

A dynamic mixer is used to continuously mix the oil sands fluid fine tailings with the water-soluble flocculating polymer, which results in a more consistent production of well-defined floc structures and subsequently leads to good dewatering. Some advantages of using a hydrofoil dynamic mixer include the ability to control the mixing energy input independent of the feed flow rate; it is a more reliable operation; and it results in more robust flocculation performance (i.e., more robust flocs). The ability to control the energy input allows one to obtain the optimal operation regime for floc formation, as above or below the optimal operation regime could result in over-shearing or under-mixing of the mixture of FFT and flocculant solution, both of which result in poor water release. Further, use of a stirred tank reactor allows the operator to control the mixing time (i.e., residence time) of the flocculant to more readily ensure a more robust flocculation performance without over-shearing or under-mixing. Ultimately, however, any mixing device can be used as long as the mixing is sufficient to flocculate the tailings and minimize the capillary suction time (CST) of the flocculated tailings, resulting in fully flocculated tailings.

Figure 2:
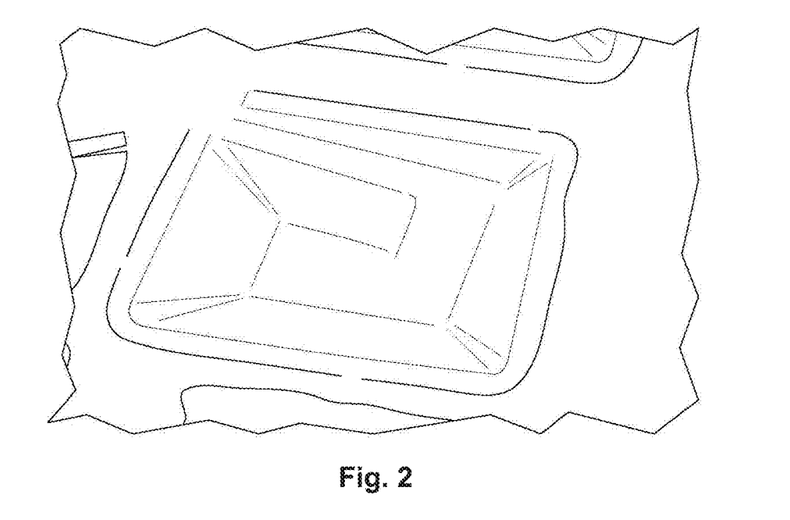
FIG. 2 is a schematic of a deposition cell useful in practicing the method provided herein.
Figure 3:
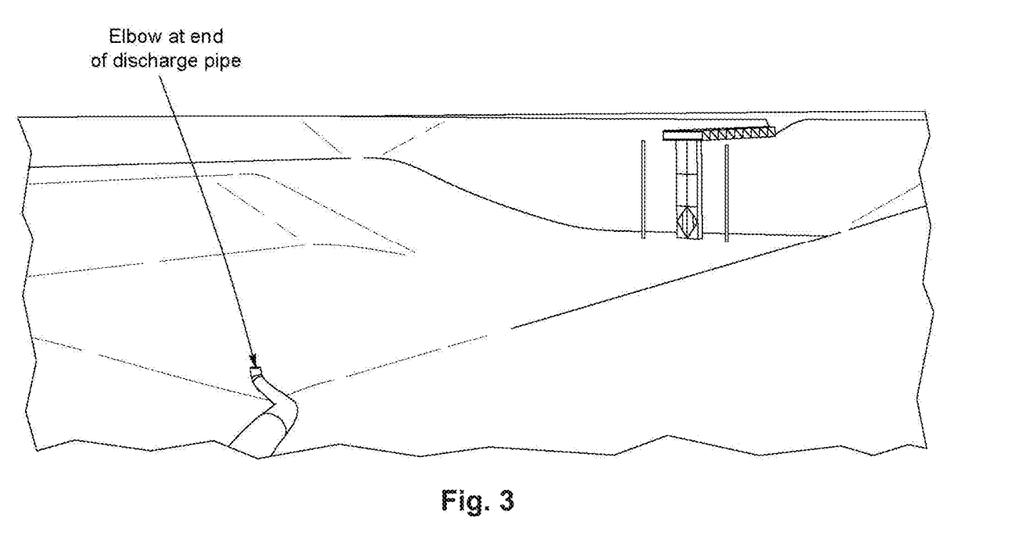
FIG. 3 is a schematic of a discharge pipe in a deposition cell modified to ensure almost zero velocity at discharge.

An aerial view of a deposition cell that can be used for depositing fully flocculated tailings is shown in FIG. 2. The deposition cell shown in FIG. 2 was used in Example 1 below to show how deposition of fully flocculated tailings should be at or near a zero discharge velocity for optimum dewatering. In particular, FIG. 3 shows a horizontal discharge pipe that transports the fully flocculated tailings from the dynamic mixer to the deposition cell. It was discovered by the present applicant that deposition of fully flocculated tailings from a horizontal pipe resulted in excess mixing energy applied to the fully flocculated tailings, resulting in over-shearing of the flocs and poor water release. This is believed to be due to the horizontal velocity of the tailings travelling through the transport pipe. Hence, a typical horizontal deposition pipe of the prior art, which generally has a large diameter of about 20 to 24 inches, was modified such that the discharge velocity of the tailings upon placement in the deposition cell was at or near zero, i.e., so that there is no further mixing and placement or deposition of the fully flocculated tailings is essentially quiescent. This was accomplished by adding a 90-degree elbow to the end of the horizontal pipe, which reduced the horizontal velocity to essentially zero. In addition, the vertical portion of the 90-degree elbow, measured from the bottom of the elbow, is relatively short, e.g., less than about two pipe diameters in length resulting in a relatively short vertical discharge end of the deposition pipe. Thus, the addition of a 90-degree elbow, together with the large discharge pipe diameter, was sufficient to essentially eliminate the horizontal velocity of the tailings as well as minimize the vertical velocity of the tailings upon discharge, resulting in minimum further mixing of the tailings at discharge.

As can be seen in FIG. 3, the discharge end of the discharge pipe of the present application is close to the surface of the deposition cell. Thus, the tailings essentially "fountain" up near or slightly beneath the surface of the tailings deposit. In one embodiment, the discharge end is between about 20 inches to about 40 inches off the ground. Essentially, the height of the vertical pipe is selected to ensure no further mixing of the fully flocculated tailings occurs, i.e., is of sufficient length to eliminate the horizontal velocity; thus, the tailings are deposited at essentially zero velocity at the surface of the tailings deposition (i.e., velocity of the tailings is net zero at discharge).

Figure 4:
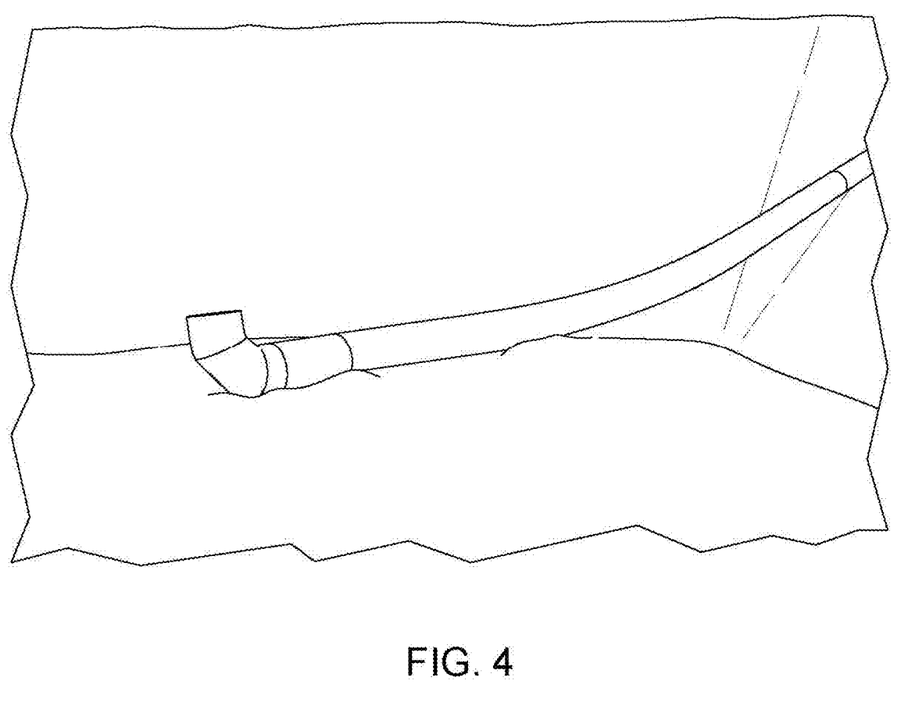
FIG. 4 is a schematic showing a close up of the discharge end of the discharge pipe of FIG. 3.

FIG. 4 is a close-up photograph of the end of pipe of FIG. 3. In FIG. 4, the fully flocculated tailings will be deposited sub-aerially, although it is understood that the tailings could also be deposited sub-aqueously, as long as the end of pipe is designed such that the discharge velocity is substantially zero at the surface of the tailings deposit. By depositing the fully flocculated tailings with essentially zero velocity, i.e., with only a minimal vertical velocity and no horizontal velocity, the stacking of the tailings deposit is maximized, thereby maximizing the slope of the tailings deposit and facilitating the release and removal of the water.

When tailings are deposited sub-aqueously, the water or tailings will help minimize the vertical velocity, which would be beneficial as long as the deposit can accumulate above the water line. This will only occur to a small extent unless the water released from the flocculation process is continuously removed. When released water is continuously removed, the end of the deposition pipe as described above will be submerged in the beached material, however, additional tailings that are deposited will form a naturally occurring channel so that the tailings would flow up though this channel and be deposited at essentially zero velocity.

Figure 5:
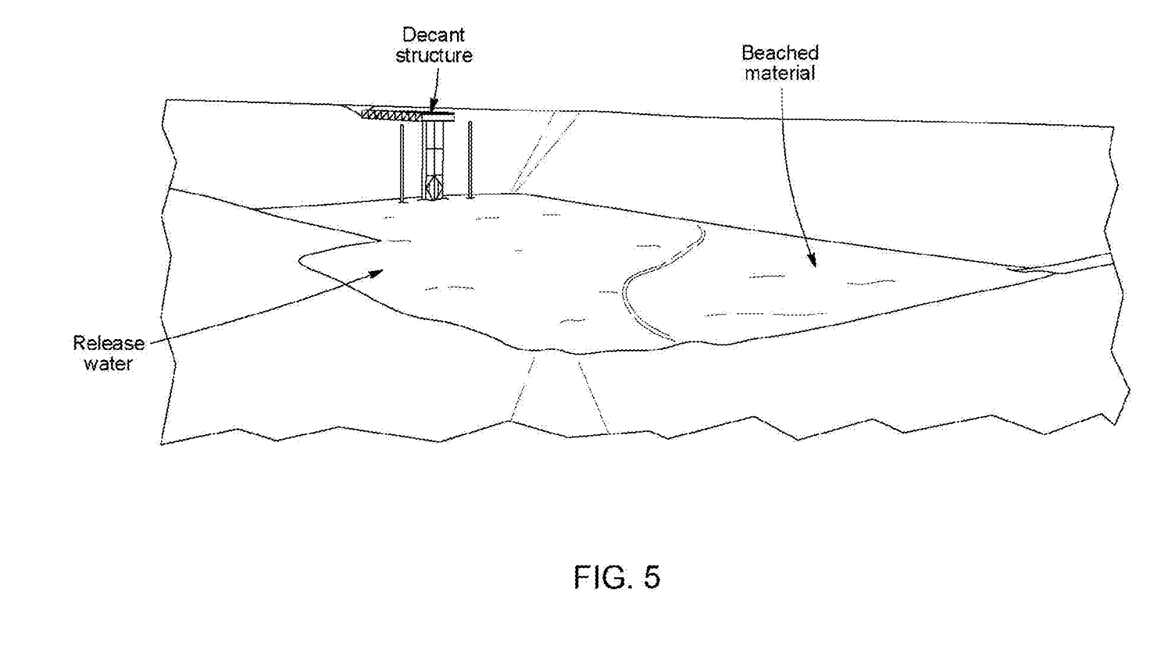
FIG. 5 is a schematic of a deposition cell filled with fully flocculated tailings, which illustrates the dewatering of the fully flocculated tailings.

FIG. 5 is an aerial photograph of a tailings deposition cell showing the water that is released from the stacked, fully flocculated tailings deposit (also referred to herein as "beached material"). As can be seen in FIG. 5 deposition of the fully flocculated tailings results in a naturally formed slope of beached material where the water released from the tailings forms a released water pool, which is at a lower elevation than the stacked beached material. It is important that the release water be continuously removed to ensure the beached material is not submerged in the released water so as to minimize any buoyant forces on the deposited or beached material. In addition, it is desirable to have the beached material exposed to the atmosphere so that the beached material can be further dewatered/consolidated for reclamation. The water was pumped off utilizing a diesel driven pump, although it is understood that other means for removing the released water pool could be used. Thus, the entire bottom of the deposition cell was sloped towards the decant structure where its base was about 1 meter lower in elevation than the discharge point. Sloping the cell facilitates better drainage of the deposited material. The purpose of the decant structure is to allow for longer-term drainage of the cell surface once the deposit reaches its final fill height. Underdrainage as is known in the art can also be incorporated into the cell.

Example 1

A deposition cell, such as shown in FIG. 2, was used in the present experiment. Fluid fine tailings (FFT) was sourced from a tailings pond and the typical solids content, i.e., mineral solids+bitumen, of the raw FFT feed averaged around 33.5 wt %. The raw FFT was diluted with recycle water and the diluted FFT stream had an average total solids content of about 30.5 wt %. During the course of the experiment, which lasted about 20 days, close to 131,000 m$^3$ of diluted FFT was flocculated and sent to the deposition cell having a volume of about 70,000 m$^3$. In the present experiment, the diluted FFT was first treated with FGD solids using an FGD solids slurry of about 13.5 wt % solids. The average dosage of FGD solids was about 3950 g/tonne. The FGD solids was added to the diluted FFT stream and mixed utilizing an inline static mixer before the mixture was sent to an agitated residence time tank. A hold up time of approximately 10 minutes was achieved in the tank, which was adequate for dissolution of the calcium ions in the FGD solids to cause coagulation of the clay particles present in the FFT. A typical FGD solids chemical composition is shown in Table 1.

TABLE 1

Chemical Composition of FGD Solids

| Chemical Formula | Name | Common Name | Average wt. % |
|---|---|---|---|
| $CaSO_3 \cdot \frac{1}{2}H_2O$ | Calcium sulfite hemihydrate | — | 44 ± 8 |
| $CaSO_4 \cdot 2H_2O$ | Calcium sulfate dihydrate | Gypsum | 6 ± 1 |
| $CaCO_3$ | Calcium carbonate | Limestone (calcite) | 9 ± 3 |
| CaO | Calcium oxide | Quicklime | <1 |
| $Ca(OH)_2$ | Calcium hydroxide | Slaked lime/hydrated lime | 30 ± 5 |
| Inerts | Coke | — | 10 ± 2 |
| $H_2O$ | Water | — | 1 ± 0.5 |

Figure 6:
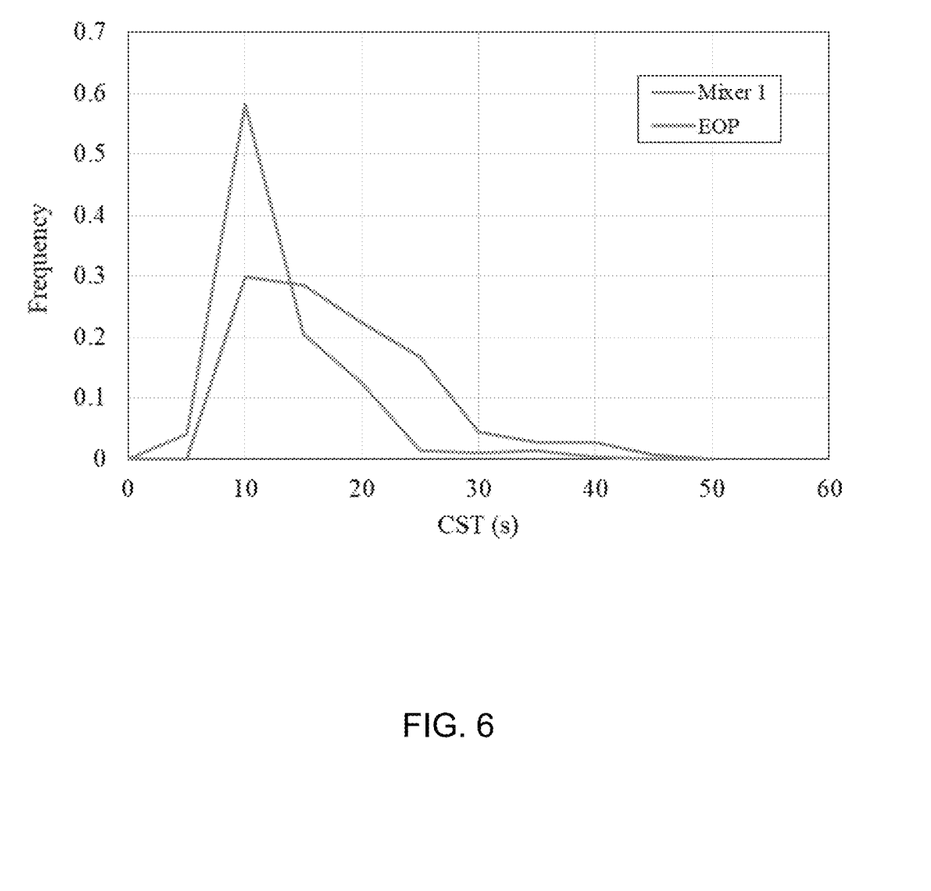
FIG. 6 is a frequency distribution graph whereby the x-axis shows the CST value range and the y-axis is the number of occurrences of that CST value during the course of the test program.

The FGD solids treated FFT was then transferred to a hydrofoil dynamic mixer consisting of two 30 inch diameter hydrofoil impellers driven by a 400 hp electric motor. Polymer was also added to the hydrofoil dynamic mixer using a polymer injection quill fabricated from 4-inch schedule 160 steel pipe and was positioned to deliver the polymer solution near the impeller tips along the vessel centerline. The polymer used was a polyacrylamide with a medium charge density and high molecular weight with an overall average dosage of 1175 g/tonne. The quality of the flocculated product was monitored via capillary suction time (CST) measurements in order to ensure that the FFT was fully flocculated, i.e., to ensure proper dewatering performance was adhered to at all times. Polymer dosage was adjusted based on CST measurements to keep the CST values in the range of 10-20 seconds. CST measurements were taken on an hourly basis and could be taken at the exit of the hydrofoil dynamic mixer or at the end of pipe location. CST measurements of the fully flocculated tailings (FFT) were measured with a Triton Electronics Type 319 Multi-CST, 5-channel unit. The measurement heads were equipped with 1.8 cm diameter by 2.5 cm high funnels. Whatman™ Grade 4 (55 mm diameter) filter paper was used for the CST measurements. All of the CST data that was taken during the filling of the deposition cell (both after the hydrofoil dynamic mixer and the end of pipe) is plotted in a frequency distribution graph shown in FIG. 6, where the x axis shows the CST value range and the y axis is the number of occurrences of that CST value during the course of the test program. It can be seen from FIG. 6 that the average CST value is in the 10-15 second range with over 95% of all the values being below a value of 30 seconds. Adequate dewatering was deemed to have been achieved if any flocculated FFT sample has a CST value of less than 50 seconds. Based on this criterion, all of the flocculated FFT that was deposited in the cell met the specification of being properly flocculated.

Nearly 80,000 m$^3$ of release water was removed from the cell, as water was continuously released while the flocculated material was deposited. After about a month or two, the total solids content of the dewatered material was about 52-55 wt %. It is understood that the dewatered material will continue to dewater over time.

Interpretation

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

The invention claimed is:

1. A process for dewatering tailings, comprising:
providing a tailings feed having a solids content in the range of about 10 wt % to about 70 wt %;
adding an effective amount of a polymeric flocculant to the tailings feed and mixing the polymeric flocculant and tailings feed mixture in a mixing device sufficient to flocculate the tailings and minimize the capillary suction time (CST) of the flocculated tailings to form fully flocculated tailings;
transporting the fully flocculated tailings to a deposition area;
discharging the fully flocculated tailings into the deposition area at a discharge velocity of substantially zero to minimize further mixing;
naturally forming a sloped beached material deposit in the deposition area whereby water is released from the sloped beached material to form a released water pool that pools away from the sloped beached material deposit; and
continuously removing water from the released water pool to ensure that the sloped beached material at a discharge point is at a higher elevation than the released water pool to minimize any buoyant forces on the beached material deposit.

2. The process as claimed in claim 1, whereby the tailings feed is first treated with an effective amount of a coagulant prior to the addition of the polymeric flocculant.

3. The process as claimed in claim 2, wherein the coagulant is selected from the group consisting of gypsum, alum and lime and is added at an average dosage of about 900 to about 1500 grams per tonne.

4. The process as claimed in claim 2, wherein the coagulant is flue-gas desulfurization (FGD) solids added at an average dosage of about 1000 to about 4000 grams per tonne.

5. The process as claimed in claim 1, wherein the fully flocculated tailings has a CST of ≤75 seconds.

6. The process as claimed in claim 5, wherein the fully flocculated tailings has a CST of <50 seconds.

7. The process as claimed in claim 5, wherein the fully flocculated tailings has a CST of <25 seconds.

8. The process as claimed in claim 5, wherein when the tailings feed has a solids content in the range of about 25 wt % to about 30 wt % solids, the CST of the fully flocculated tailings is about <25 seconds to about <50 seconds.

9. The process as claimed in claim 5, wherein when the tailings feed has a solids content in the range of about 30 wt % to about 35 wt % solids, the CST of the fully flocculated tailings is about ≤50 seconds to about ≤75 seconds.

10. The process as claimed in claim 1, wherein the fully flocculated tailings are discharged either sub-aerially or sub-aqueously.

11. The process as claimed in claim 10, wherein the fully flocculated tailings are deposited sub-aerially at or near the surface of the sloped beached material deposit.

12. The process as claimed in claim 1, wherein the fully flocculated tailings are transported to the deposition area by means of a horizontal pipe, said horizontal pipe having a discharge end comprising a 90 degree elbow, whereby the vertical portion of the 90 degree elbow, measured from the bottom of the elbow, is less than about two horizontal pipe inner diameters in length.

13. The process as claimed in claim 12, wherein the horizontal pipe has an inner diameter of 20 to 24 inches.

14. The process as claimed in claim 1, wherein the tailings feed is oil sand tailings.

15. The process as claimed in claim 14, wherein the oil sand tailings are fluid fine tailings (FFT) or mature fine tailings (MFT).

16. The process as claimed in claim 15, wherein the FFT or MFT are diluted to about 20 wt % to about 30 wt % solids content.

17. The process as claimed in claim 1, wherein the tailings feed has a solids content in the range of about 15 wt % to about 45 wt %.

18. The process as claimed in claim 1, wherein the polymeric flocculant is a water soluble polymer having a molecular weight between 1,000 kD and 50,000 kD, and an intrinsic viscosity of at least about 3 dl/g (measured in 1M NaCl at 25° C.).

19. The process as claimed in claim 1, wherein the polymeric flocculant is a cationic, non-ionic, amphoteric, or anionic polymeric flocculant.

20. The process as claimed in claim 1, wherein the polymeric flocculant has a charge density of 25-35% anionicity.

21. The process as claimed in claim 1, wherein the dosage of polymeric flocculant added ranges from 10 grams to 10,000 grams per tonne of tailings feed.

22. The process as claimed in claim 21, wherein dosage of polymeric flocculant ranges from about 400 to about 1,500 grams per tonne of tailings.

23. The process as claimed in claim 1, wherein the polymeric flocculant is a polyacrylamide-sodium polyacrylate co-polymer with about 25-35% anionicity and a molecular weight of 1,000 kD to 50,000 kD.

24. The process as claimed in claim 1, wherein the mixing device is a dynamic mixer.

* * * * *